G. F. Wilson.
Preparing Bones for Acid Phosphates.
Nº 75329        Patented Mar. 10, 1868
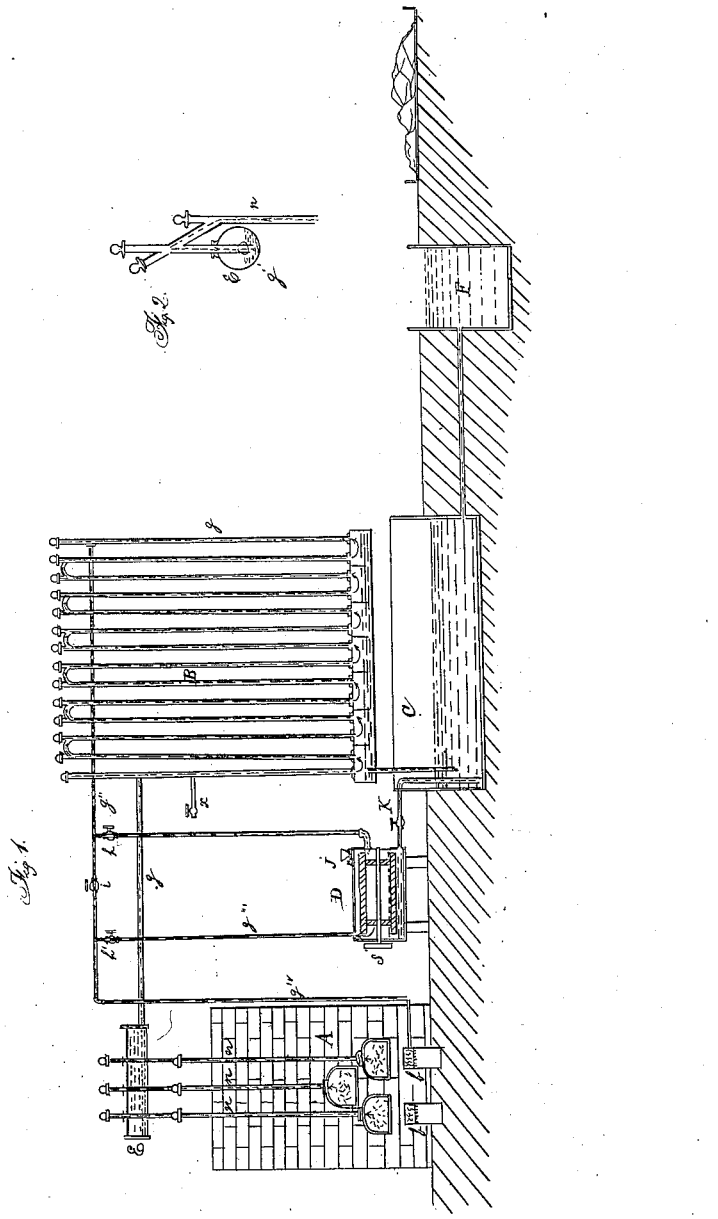
Witnesses
William Hedge
N. H. McGenery
Inventor
Geo. F. Wilson

United States Patent Office.

GEORGE F. WILSON, OF EAST PROVIDENCE, RHODE ISLAND.

Letters Patent No. 75,329, dated March 10, 1868.

IMPROVEMENT IN PREPARING BONES FOR THE MANUFACTURE OF ACID PHOSPHATES.

The Schedule referred to in these Letters Patent and making part of the same.

TO ALL WHOM IT MAY CONCERN:

Be it known that I, GEORGE F. WILSON, of East Providence, in the county of Providence, and State of Rhode Island, have invented a new and improved Mode of Distilling Bones, or of preparing bones by partial calcination in retorts for the preparation of Horsford's acid phosphate of lime for culinary and domestic uses; and I do hereby declare that the following is a full and exact description thereof, reference being had to the accompanying drawings and to the letters of reference marked thereon.

The object of this invention is to prepare bones by partial burning or distillation for the subsequent process of special roasting, essential to the production of acid phosphate of lime in condition to be used in preparing Horsford's patent acid phosphate of lime for domestic uses, and also to prevent the products of distillation from escaping into the air.

In my earlier attempts to obtain the acid phosphate above referred to in liquid form, I found that bones burned to whiteness, when treated with oil of vitriol, formed a paste, which rapidly filled up the pores of the felt at the bottom of the leach, and arrested the leaching. To prevent this, it was found necessary that the burned bone should retain its porosity after treatment with sulphuric acid, and this was attained by leaving a certain amount of unburned carbon in the body of the burned and ground bone, which should preserve a skeleton of the grains, and thus permit the water of lixiviation to penetrate and leach the mass. It was necessary, however, that the cyanides and sulphides left by distillation should be removed to prevent the communication of unpleasant odors to the acid liquor, on treatment of the burned bones with the oil of vitriol, and also necessary to render the oxide of iron in the bones insoluble, so as to prevent the discoloration of the liquor and final product. These ends were gained by distillation and cooling substantially out of contact with the air, and subsequent heating or roasting, with the access only of a very small and regulated amount of air.

I attempted to burn the bones in vertical cylinders or retorts, by filling them with bones from the top, applying the heat around the curved surfaces, and drawing off at intervals at the bottom, in coolers, excluding the air; but the difficulty of maintaining the masonry around the flues, and of maintaining tight joints, and so preventing the gases from becoming a nuisance to the neighborhood, led me to abandon this plan. After much experiment I devised and carried out the following plan:

Three gas-retorts are set horizontally in a bench, with fire and smoke-flues, substantially like those of an ordinary gas-retort bench. Connecting at the top with the forward end of each retort is a vertical tube, conducting to a reservoir, which connects with a system of vertical condensers, arranged in the open air over tanks for the reception of the condensed gases, including carbonate of ammonia. The uncondensed gases, including ammoniacal gases, as well as hydrocarbon and other volatile gases, are conducted through an agitator containing muriatic or sulphuric acid, so as to abstract the last traces of ammonia, and are then conducted under the bench and discharged into the fire, and so prevented from escaping to become an offense to the neighborhood.

The accompanying diagrams exhibit the connections of the several parts.

A is the bench of retorts, with the vertical tubes $n\ n\ n$ leading from the front end of each of said retorts to the reservoir E, and the system of condensing-pipes B, with the tank C and the agitator D.

The mode of use is the following: The retorts are filled with boiled bones, and the doors luted with clay and keyed tight. The heat of the fire on the bars $f$ circulating around the retorts, converts the water contained in the bones to steam, which steam expels the most of the atmospheric air from the retorts, and then the various products of destructive distillation drive out the steam, until there remain of the bones, besides the phosphate of lime and a small amount of other mineral constituents, a quantity of carbon and certain cyanides and sulphides, and other compounds not material to be specified. The gases rising through the vertical tubes $n\ n\ n$, Figure 1, are partially condensed in the reservoir E, the outlet of said tubes $n\ n\ n$ being immersed in the condensed liquor contained in the reservoir E, the form and connections of said tubes with the reservoir being shown in fig. 2. In passing thence to the system of cast-iron condensers B, the gases are so nearly condensed that at the end $g'$ little remains but permanently volatile hydrocarbons and traces of ammoniacal compounds. To save the ammonia, the residual gases are passed through the cask or chamber D, containing hydrochloric or sulphuric acid, kept in agitation by a revolving dasher, the cock $i$ being closed, and the cocks $h$ and $h'$ open. Freed of its ammonia, the hydrocarbon is passed through the pipe $g^{iii}\ g^{iv}$, to be burned in the grate under the retorts, while the ammonia combined with the acid in the chamber D is from time to time discharged, when the liquor is saturated through the pipe $k$ into the tank C, by occasionally turning the cock in said pipe. $j$ is a funnel, closed by a cock, $r$, through which the acid is supplied to the chamber D as wanted. $s$ is a pulley, through which motion is communicated to the dasher in the chamber D. It is sometimes found convenient to make a supplementary reservoir, F, connected with the reservoir C.

When the charge is distilled, the black bones are quickly raked out into an iron box or cooler, and the cover, with a luting of clay previously prepared, quickly brought to its place. The air being excluded, the bones cool without becoming white. As soon as one charge is distilled, and the black bones withdrawn, another charge takes its place. The condensed liquor in C may flow over into F, where it may be neutralized, with acid and prepared to be used as a fertilizer, or for other purposes.

With this apparatus the bones are prepared for future processes without the escape of gases to any considerable extent into the air. Carbonate of ammonia condenses along the interior of the pipes, more especially in cold weather, and obstructs the flow of gases. To prevent this, jets of steam are introduced from time to time at any convenient part of the condensers, as, for instance, at $x$, which dissolve the carbonate of ammonia and carry it to the tank C.

What I claim, and desire to secure by Letters Patent of the United States, is—

1. The new and improved method or process of destructive distillation of bones, whereby the products of distillation are principally condensed, the ammoniacal products thereof preserved, and the remaining gases conveyed to the furnace, thereby adding heat to the flame and destroying the offensive odors, substantially as above described.

2. A new and improved means or method of destructive distillation of bones by the use of horizontal retorts, in connection with the coolers above described, whereby the retorts of the furnace may be continuously used without losing their heat, while at the same time the burned or distilled bone is being cooled and excluded from the air in said coolers.

3. The combination of the retorts A, the reservoir E, the condenser B, and the chamber D, with its mechanical agitator, or its equivalent, and the connecting-pipes above described, substantially as and for the purposes hereinbefore set forth.

4. The combination of the retorts A, the reservoir E, the condenser B, and the connecting-pipe $g^{ii}$ $g^{iv}$, for the purpose above described.

GEO. F. WILSON.

Witnesses:
WILLIAM HEDGE,
W. H. McGRENERY.